United States Patent [19]

Bey

[11] 4,424,297

[45] Jan. 3, 1984

[54] COLLOIDAL SILESQUIOXANES

[75] Inventor: Alvin E. Bey, Midland, Mich.

[73] Assignee: Dow Corning Corporation, Midland, Mich.

[21] Appl. No.: 396,532

[22] Filed: Jul. 8, 1982

[51] Int. Cl.$^3$ ............................................. C08G 77/06
[52] U.S. Cl. .................................. 524/714; 524/773; 524/777; 524/837
[58] Field of Search ................. 524/714, 773, 777, 837

[56] References Cited

U.S. PATENT DOCUMENTS

| | | | |
|---|---|---|---|
| 2,798,858 | 7/1957 | Brown | 524/837 |
| 2,891,920 | 6/1959 | Hyde et al. | 524/837 |
| 3,433,780 | 3/1969 | Cekada et al. | 524/158 |
| 4,175,159 | 11/1979 | Raleigh | 428/405 |

FOREIGN PATENT DOCUMENTS

| | | | |
|---|---|---|---|
| 464225 | 4/1950 | Canada | 524/777 |
| 719174 | 11/1954 | United Kingdom | 524/777 |
| 1191289 | 5/1970 | United Kingdom | 524/837 |

*Primary Examiner*—Ronald W. Griffin
*Attorney, Agent, or Firm*—Richard A. Kaba

[57] ABSTRACT

Colloidal suspensions of silsesquioxanes of the general formula $RSiO_{3/2}$, wherein R is a hydrocarbon or a substituted hydrocarbon radical containing from 1 to 7 carbon atoms, are prepared by the emulsion polymerization of a silane of general formula $RSi(OR')_3$ in a water surfactant mixture with a pH greater than or equal to 8 where the resulting silsesquioxanes has an average particle size of about 10 to 1000 angstroms. The surfactant is an organic carboxylic acid having greater than eight carbon atoms or a water soluble salt of the same carboxylic acids.

16 Claims, No Drawings

COLLOIDAL SILSESQUIOXANES

BACKGROUND OF THE INVENTION

Colloidal suspensions of silsesquioxanes have been prepared in the prior art. In U.S. Pat. No. 3,433,780 (Mar. 18, 1969), Cekada and Weyenberg describe colloidal suspensions of silsesquioxanes prepared by the emulsion polymerization of silanes of the general formula RSi(OR″)$_3$ in a water-surfactant mixture. The surfactants employed by Cekada et al. were various organic substituted sulfonic acids and quaternary ammonium halides or hydroxides. Hyde and Wehrly in U.S. Pat. No. 2,891,920 (June 23, 1959), teach a general method of emulsion polymerization of organosiloxanes of the general formula R$_n$SiO$_{(4-n)/2}$ where n has an average value from 1 to less than 3. The procedures of Hyde et al. required the use of either strongly acidic or basic catalysts along with various emulsifying agents. The strongly acidic and basic catalysts of Hyde et al. are characterized by their ability to rearrange siloxane bonds. In neither Cekada et al. nor Hyde et al. were carboxylates or organic carboxylic acids employed in the emulsion polymerization of silanes or siloxanes.

Carboxylates have been employed as surfactants for siloxane emulsions prepared by mechanical techniques. Raleigh in U.S. Pat. No. 4,175,159 (Nov. 20, 1979) prepared mechanism emulsions of siloxanes having R$_2$SiO units, RSiO$_{3/2}$ units and R$_3$SiO$_{1/2}$ units where the ratio of RSiO$_{3/2}$ to R$_2$SiO units varies from 0.11 to 1.4 and the ratio of R$_3$SiO$_{1/2}$ to R$_2$SiO units varies from 0.02 to 1 and where the siloxane has a silanol content varying from 0.1 to 8% by weight. The preferred emulsifying agent of Raleigh is the reaction product of an aliphatic carboxylic acid with ammonia. Raleigh further teaches that the above described ratios of the various siloxy units "must be observed if the mixture is not to gel upon hydrolysis and if the mixture is to have the desired properties". The silicone emulsion mixtures of Raleigh were used for treating silicate particulate materials such as perlite and vermicilite to make them water-resistant. There are no teachings in Raleigh or the other cited art that suggest that carboxylates would be useful as surfactants in the emulsion polymerization preparation of silsesquioxanes. Therefore, it is indeed surprising, especially in light of the teachings of Raleigh, that it has now been discovered that stable silsesquioxanes emulsions can be prepared by the emulsion polymerization of silanes of the formula RSi(OR′)$_3$ using carboxylates as surfactants.

SUMMARY OF THE INVENTION

This invention relates to a process for making a stable colloidal suspension of a silsesquioxane with an average unit formula RSiO$_{3/2}$, where R is a monovalent hydrocarbon or substituted hydrocarbon radical containing 1 to 7 carbon atoms, which process comprises adding a silane having the formula RSi(OR′)$_3$, wherein R′ is selected from the group consisting of hydrogen, alkyl groups containing 1 to 4 carbon atoms,

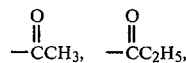

—CH$_2$CH$_2$OH, —CH$_2$CH$_2$OCH$_3$, and —CH$_2$CH$_2$OC$_2$H$_5$ groups, to a water and surfactant mixture, with agitation, where said water and surfactant mixture contains a sufficient amount of a pH modifying substance or substances to obtain a pH greater than or equal to 8 for said water and surfactant mixture prior to addition of said silane; where said surfactant is an organic carboxylic acid having greater than 8 carbon atoms or a water soluble salt of said carboxylic acid; and where said silsesquioxane has an average particle size of about 10 to 1000 angstroms.

This invention also relates to a stable colloidal suspension of a silsesquioxane having an average unit formula RSiO$_{3/2}$, where R is a monovalent hydrocarbon or substituted hydrocarbon radical containing 1 to 7 carbon atoms; where said colloidal suspension is prepared by the emulsion polymerization of a silane of formula RSi(OR′)$_3$ where R′ is selected from the group consisting of hydrogen, alkyl groups containing 1 to 4 carbon atoms,

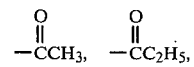

—CH$_2$CH$_2$OH, —CH$_2$CH$_2$OCH$_3$, and —CH$_2$CH$_2$OC$_2$H$_5$ groups, in a water and surfactant mixture containing a sufficient amount of a pH modifying substance or substances to obtain a pH greater than or equal to 8 for said mixture prior to the addition of said silane; where said surfactant is an organic carboxylic acid having greater than 8 carbon atoms or a water soluble salt of said carboxylic acid; and where said silsesquioxane has an average particle size of about 10 to 1000 angstroms.

DETAILED DESCRIPTION OF THE INVENTION

The colloidal suspensions of this invention are prepared by adding a silane having the general formula RSi(OR′)$_3$ to a water-surfactant mixture, with agitation, under basic conditions. It is preferred that the silane be added at a slow rate to help insure the formation of a stable emulsion. By "slow rate" we mean a rate of addition less than about ten moles of silane per liter per hour. It is most preferred that the rate of addition be less than five moles of silane per liter per hour. Emulsions containing upwards of 10% by weight of silsesquioxane solids have been produced. The exact amount of solids in a given emulsion will depend upon numerous variables including the substituent R, the surfactant employed, and the pH modifying substance used. However, in all cases the total amount of silane employed should not exceed that amount which would give an ultimate solids content greater than that which the particular system involved can tolerate. The processes of this invention can be used for producing the colloidal suspensions of silsesquioxanes either batch-wise or continuously.

In the general formula RSi(OR′)$_3$, the substituent R can be any monovalent radical selected from the group consisting of hydrocarbon and substituted hydrocarbon radicals containing 1 to 7 carbon atoms. Thus R can be, for example, an alkyl, alkenyl, alkynyl, cycloalkyl, aryl, alkaryl, or aralkyl radicals, or the corresponding radicals containing substituents such as halogen atoms or mercapto, hydroxyl, cyano, amino, epoxy or acryloyl groups. Of course when any substituent is present that reacts with water under the existing conditions, it will not be present as such in the final product.

Specific examples of R include the methyl, ethyl, propyl, isopropyl, butyl, amyl, heptyl, vinyl, butenyl, cyclobutyl, cyclohexyl, phenyl, tolyl, benzyl, chloromethyl, 3-bromopropyl, 3,3,3-trifluoropropyl, 5,5,5,4,4,3,3-heptafluoropentyl, dichlorophenyl, $\alpha,\alpha,\alpha$-trifluorotolyl, mercaptoethyl, mercaptopropyl, cyanoethyl, cyanopropyl, aminopropyl, methyl, $H_2NCH_2CH_2NH(CH_2)_3—$, $H_2NCH_2CH_2NHCH_2CH(CH_3)CH_2—$, aminophenyl, $CH_2=CHCOO(CH_2)_3—$, $CH_2=C(CH_3)COO(CH_2)_3—$,

hydroxypropyl or a $HOCH_2CH(OH)CH_2SCH_2CH_2—$ radical.

Of the foregoing radicals, the methyl, 3,3,3-trifluoropropyl, 3-mercaptopropyl, and phenyl radicals are preferred.

In the hydrolyzable portion of the silanes used to prepare the colloidal suspensions, the R' group can be a hydrogen atom or any alkyl group containing 1 to 4 carbon atoms, such as a methyl, ethyl, propyl, isopropyl or a butyl group, or R' can be a

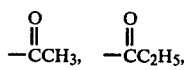

$—CH_2CH_2OH$, $—CH_2CH_2OCH_3$ or a $—CH_2CH_2OC_2H_5$ group. It is preferred that R' be a methyl or ethyl group. That is to say, it is preferred to use methoxy or ethoxy silanes in the processes of this invention.

Of course the formula $RSiO_{3/2}$ covers copolymers, both block and random, of the silsesquioxanes. Such copolymers can be produced by the sequential addition of the appropriate silanes or the addition of a mixture of the appropriate silanes to the water-surfactant mixture. It will be obvious that when the R groups are substituted hydrocarbon radicals that mutually reactive substituents should not be used for making copolymers.

The surfactants useful in the present invention are the carboxylic acids containing more than 8 carbon atoms and the water soluble salts of the same carboxylic acids. In a carboxylic acid of general formula R'''COOH it is preferred that R''' be an aliphatic organic group containing from 9 to 20 carbon atoms. Examples of such carboxylic acids include capric acid, lauric acid, myristic acid, palmitic acid, stearic acid, oleic acid, linoleic acid and linolenic acid. The most preferred acids are lauric, stearic, and oleic acids. The water soluble salts useful as surfactants in the present invention are the various salts of the just described carboxylic acids. The useful water soluble salts include the alkali metal salts such as sodium and potassium salts, the ammonium salts, and substituted ammonium salts such as triethanolamine and 1,1,3,3-tetramethylguanidinium salts. The preferred water soluble salts are the ammonium salts with the most preferred species being ammonium laurate, ammonium stearate, and ammonium oleate. The carboxylic acid salts may either be added as the salt or formed in situ by a reaction of the carboxylic acid with a base present as the pH modifying substance. As is well known, a carboxylic acid in a neutral or acidic aqueous solution will remain predominantly un-ionized and will be insoluble in the aqueous medium. Under such conditions the carboxylic acid will not exhibit surface activity. Under basic conditions, however, a water soluble carboxylic acid salt will be formed which does exhibit surface activity.

Combinations of the various carboxylic acids and water soluble carboxylic acid salts may also be employed. The surfactant is added in an amount sufficient to insure a stable colloid with the desired average particle size of 10 to 1000 angstroms. The amount of surfactant will vary depending upon the silane, surfactant, and pH modifying substances used. Using, for example, methyltrimethoxysilane and ammonium laurate in a 0.05 molar ammonia solution, it was found that the surfactant concentration in parts by weight should be in the range of about 0.01 to 0.05 parts per one part of $CH_3SiO_{3/2}$ in order to obtain emulsions with the desired properties. It is preferred that the surfactant concentration be in the range of 0.02 to 0.04 parts surfactant per each part $CH_3SiO_{3/2}$.

In order to insure that the carboxylic acid is present in the form of its surface active salt, the pH of the aqueous medium is adjusted to be above or equal to 8 by the addition of a base. The preferred pH range is about 8.5 to 10.5. Examples of the bases that can be used include sodium and potassium hydroxides, ammonia, triethylanolamine, and 1,1,3,3-tetramethylguanidine. The preferred pH modifying substance is ammonia. When ammonia is used as the pH modifying substance at least a portion of the surfactant is an ammonium carboxylate even if another carboxylic acid salt is also employed as the added surfactant. In general, stable colloids with the desired properties were formed with ammonia present in about 0.02 to 0.1 moles per liter (or molar) concentration. It is preferred that ammonia be used at a concentration of 0.04 to 0.06 molar.

The process of this invention can be carried out at any desired temperature, for example, from 0° to 100° C. or higher. Preferably, of course, the process should be carried out at a temperature below the boiling point of water although, if desired, temperatures above 100° C. can be employed if the process is carried out in a closed system. The preferred temperature range is from 15° to 90° C. with a temperature around that of room temperature being the most preferred.

The silsesquioxanes can be recovered from the colloidal suspensions in any manner if recovery of the silsesquioxane per se is desired. For example, the silsesquioxanes can be separated from the suspension by the addition of salts such as sodium chloride, by the addition of water soluble alcohols such as methanol, ethanol or isopropanol, or by the evaporation of the water. These and other means of recovering materials from colloidal suspensions are well known to those skilled in the art. Of course, it is not necessary to separate the silsesquioxane from the suspension prior to its use and in some instances it is even preferable or essential not to do so.

The colloidal suspensions of the present invention have an extremely small average particle size in the range of 10 to 1000 angstroms. The carboxylate stabilized suspensions of this present invention have the same uses as the prior art, non-carboxylate stabilized silsesquioxanes emulsions. For example, the present colloidal suspensions are useful for treating fabrics to render them resistant to soiling, as fillers in latexes, and as release agents. Colloidal suspensions where the average particle size of the silsesquioxane is in the range of 10 to 500 angstroms are particularly preferred for the above mentioned uses.

The colloidal suspensions of the present invention have several advantages over the silsesquioxane suspensions produced in the prior art. For example, when the preferred ammonium carboxylate surfactants are heated they are converted into the non-surface active carboxylic acid and ammonia. The fugitive nature of the ammonium carboxylates can be used to good advantage where colloidal suspensions are desired but a surface active residue is either not desired or cannot be tolerated when the silsesquioxane is deposited on a substrate. Such a non-surface active residue on the treated substrate would tend to suppress or eliminate such undesireable process such as back-wetting or foaming. Additionally, since the residual carboxylic acids are very weak acids, their catalytic effect on siloxane degradation will be minimal. In contrast, sulfonic and sulfuric acids, which may result upon acidification or degradation of the prior art sulfonate surfactants can cause serious degradation of siloxane bonds.

In order that those skilled in the art may better understand how the present invention can be practiced, the following examples are given by way of illustration and not by way of limitation.

All parts and percents referred to herein are on a weight basis unless otherwise specified.

EXAMPLE 1

This example shows the formation of a stable colloidal suspension of $CH_3SiO_{3/2}$, wherein the average particle size of the silsesquioxane was in the range of 10 to 1000 angstroms, prepared by the emulsion polymerization of methyltrimethoxysilane in a basic aqueous solution using ammonium laurate as the surfactant. A mixture consisting of 0.375 g of lauric acid, 1.3 g of a 10% aqueous ammonia solution, and 133.1 g of water was placed in a flask equipped with a stirrer, condenser, and addition funnel. The pH of the mixture was found to be 9.5 using a Corning Model 10 pH meter. The ammonia was added in an amount sufficient to convert the lauric acid to its ammonium salt and render the final solution, after addition of the silane, about 0.04 M in ammonia. Emulsion polymerization was initiated by adding methyltrimethoxysilane (15.2 g) dropwise, via the addition funnel, to the stirred solution at room temperature over a two hour period. The amount of added surfactant and silane were such that there were 0.05 parts of ammonium laurate present for every one part $CH_3SiO_{3/2}$. The resulting emulsion was hazy blue in appearance. Stirring overnight produced no changes in the appearance of the emulsion. Using standard techniques it was determined that the colloid contained 5.6% solids. The solids had the appearance of a white hard resinous solid. Particle size analysis was by electron microscopy. The average particle size was the number average of 20 to 30 colloidal particles on a single micrograph. The colloidal suspension had an average particle size of 370 angstrom with a particle size range of 260 to 430 angstroms.

All other examples were carried out using the same general procedure as detailed in Example 1 except as specifically noted.

EXAMPLE 2

This example shows the emulsion polymerization of methyltrimethoxysilane using ammonium laurate as the surfactant where the ratios of the various components are varied. The same procedure of Example 1 are employed. The amounts of the various components are shown in the following TABLE I.

TABLE I

| RUN | Lauric Acid, g | $NH_3$, g[a] | $NH_3$, M[b] | $H_2O$, g | pH[c] | $CH_3Si(OCH_3)_3$, g[d] | Pts surfactant/pt $CH_3SiO_{3/2}$ |
|---|---|---|---|---|---|---|---|
| A | 1.10 | 6.97 | 0.05 | 230.9 | 9.6 | 61.0 | 0.04 |
| B | 0.83 | 6.53 | 0.05 | 231.6 | 9.6 | 61.0 | 0.03 |
| C | 0.55 | 6.15 | 0.05 | 232.3 | 9.6 | 61.0 | 0.02 |
| D | 1.38 | 4.39 | 0.02 | 233.2 | 9.0 | 61.0 | 0.05 |
| E | 0.55 | 11.15 | 0.10 | 227.3 | 9.6 | 61.0 | 0.02 |

[a]The weight of a 5% ammonia in water solution.
[b]The amount of ammonia added was sufficient to convert all of the acid to its ammonium salt and yield the indicated molar ammonia solution after the addition of the silane.
[c]pH determined before the silane addition.
[d]Silane was added dropwise over a period of 2 hours except in C where it was added over a 1½ hour period.

In each of runs A through E a stable colloidal suspension was prepared by emulsion polymerization of the methyltrimethoxysilane. The following TABLE II summarizes the results obtained.

TABLE II

| Run | Percent Solids | Average Particle Size, °A | Particle Size Range, °A | Emulsion Appearance |
|---|---|---|---|---|
| A | 10.7 | 290 | 220–360 | bluish-white |
| B | 10.2 | 350 | 300–420 | bluish-white |
| C | 11.1 | 590 | 160–1020 | bluish-white |
| D | 11.0 | 660 | 380–840 | milky-white |
| E | 10.4 | 310 | 70–550 | bluish-white |

EXAMPLE 3

This example shows the formation of a stable colloidal suspension of $CH_3SiO_{3/2}$ prepared by the emulsion polymerization of methyltrimethoxysilane in a basic aqueous solution using sodium laurate and ammonium laurate as surfactants. Lauric acid (0.38 g) was first combined with an equivalent amount (1.9 g of a 0.1 N aqueous solution) of sodium hydroxide in a small amount of water. The acid did not appear to readily dissolve. Upon adding ammonia (1.3 g of 10% aqueous ammonia solution) the acid dissolved. A total of 131.2 g of water was added. It seems reasonable to assume that both sodium laurate and ammonium laurate are present. The actual emulsion polymerization was carried out using the same procedure as described in Example 1 by adding 15.2 g of methyltrimethoxysilane to the basic aqueous surfactant mixture over a period of two hours at room temperature. The resulting emulsion was a light hazy blue with a solids content of 5.2%. The average particle size was 280 angstroms with a range of 190 to 400 angstroms.

EXAMPLE 4

This example shows the formation of stable colloidal suspensions of $CH_3SiO_{3/2}$, with an average particle size between 10 and 1000 angstroms, prepared by the emulsion polymerization of methyltrimethoxysilane in a basic aqueous solution using ammonium stearate as the surfactant. The procedure of Example 1 was employed. The amounts of the various components are shown in TABLE III.

TABLE III

| Run | Steric acid, g | $NH_3$, $g^a$ | $NH_3$, $M^b$ | $H_2O$, g | $pH^c$ | $CH_3Si\,(OCH_3)_3$, $g^d$ | Pts surfactant Pt $CH_3SiO_{3/2}$ |
|---|---|---|---|---|---|---|---|
| A | 1.42 | 5.8 | 0.05 | 231.8 | 10.0 | 61.0 | 0.05 |
| B | 1.42 | 11.9 | 0.10 | 225.7 | 10.2 | 61.0 | 0.05 |
| C | 0.57 | 10.9 | 0.10 | 227.5 | 10.3 | 61.0 | 0.02 |

[a] See footnote "a", TABLE I.
[b] See footnote "b", TABLE I.
[c] See footnote "c", TABLE I.
[d] The silane was added dropwise over a period of 2 hours except in run B where it was added over a 1¼ hour period.

In each of runs A through C a stable colloidal suspension was prepared by emulsion polymerization of the methyltrimethoxysilane. The following TABLE IV summarizes the results obtained.

TABLE IV

| Run | Percent Solids | Average Particle Size, °A | Particle Size Range, °A | Emulsion Appearance |
|---|---|---|---|---|
| A | 10.8 | 580 | 330–3700 | milky-white |
| B | 10.6 | 720 | 500–1160 | milky-white |
| C | 10.3 | 830 | 510–2000 | milky-white |

EXAMPLE 5

This example shows the formation of stable colloidal suspensions of $Ch_3SiO_{3/2}$ prepared by the emulsion polymerization of methyltrimethoxysilane in a basic aqueous solution using sodium stearate as the surfactant. This example differs from Examples 1–4 in that surfactant is added as the sodium salt directly rather than being formed in situ by the reaction of the organic carboxylic acid and a base. The amounts of the various components are given in TABLE V.

TABLE V

| Run | Sodium Stearate, g | $NH_3$, $g^a$ | $NH_3$, M | $H_2O$, g | $pH^b$ | $CH_3Si\,(OCH_3)_3^c$ | Pts surfactant Pt $CH_3SiO_{3/2}$ |
|---|---|---|---|---|---|---|---|
| A | 0.375 | 1.3 | 0.05 | 133.1 | — | 15.2 | 0.05 |
| B | 1.5 | 2.04 | 0.02 | 235.5 | 9.8 | 61.0 | 0.05 |
| C | 0.60 | 2.04 | 0.02 | 236.4 | 10.3 | 61.0 | 0.02 |
| D | 0.60 | 5.1 | 0.05 | 233.3 | 10.4 | 61.0 | 0.02 |

[a] Run A employed a 10% aqueous ammonia solution whereas a 5% solution was used in the other runs
[b] pH determined before addition of silane. The pH in Run A was not determined.
[c] Silane added dropwise over a 2 hour period.

In each of runs A through D a stable colloidal suspension of the silsesquioxane $CH_3SiO_{3/2}$ was prepared. The results obtained are summarized in TABLE VI.

TABLE VI

| Run | Percent Solids | Average Particle Size, °A | Particle Size Range, °A | Emulsion Appearance |
|---|---|---|---|---|
| A | 5.5 | 260 | 200–290 | Deep hazy blue |
| B | 11.4 | 440 | 270–780 | bluish-white |
| C | 10.2 | 460 | 350–2000 | bluish-white |
| D | 11.9 | 350 | 260–1300 | bluish-white |

EXAMPLE 6

This example shows the formation of stable colloidal suspensions of $CH_3SiO_{3/2}$ prepared by the emulsion polymerization of methyltrimethoxysilane using either sodium or ammonium oleate as the surfactant. Oleic acid (5.0 g), ammonia (2.9 g of a 28.8% aqueous solution), and water (992.1 g) were mixed; the pH was 9.7. Methyltrimethoxysilane (15.2 g) was added dropwise to 134.8 g of the surfactant-water mixture. A hazy-blue emulsion with a solid content of 5.8% resulted. The average particle size was 520 °A with a range of 460–590 °A.

Sodium oleate was prepared by mixing 50 g of oleic acid with 188 g of a 0.1 N sodium hydroxide solution overnight. The resulting sodium oleate solution (7.5 g) was mixed with 0.44 g of a 28.8% ammonia solution and 136.9 g of additional water. To this resulting mixture 15.2 g of methyltrimethoxysilane was added, dropwise over a 2 hour period. A light hazy-blue emulsion with 5.2% solids resulted. The average particle size was 280 °A with a particle size range of 210–300 °A.

EXAMPLE 7

This example shows the formation of a stable colloidal suspension of $CH_3SiO_{3/2}$ prepared by the emulsion polymerization of methyltrimethoxysilane in a basic aqueous solution using the ammonium and triethanolamine salts of lauric acid as surfactants. Methyltrimethoxysilane (15.2 g) was added dropwise over a two hour period to a mixture consisting of lauric acid (0.375 g), ammonia (1.3 g of a 10% aqueous solution), triethanolamine (0.279 g) and water (132.8 g). A hazy blue emulsion with 5.7% solids resulted. The solid was a hard white resin. The average particle size was 360 °A with a range of 300–400 °A.

In a similar experiment, methyltrimethoxysilane (15.2 g) was added dropwise to a mixture (pH 8.6) of lauric acid (0.375 g), triethanolamine (1.117 g), and water (133.3 g). Ammonia was not added. A milky white emulsion with 6.4% solids resulted. The solid was a white semi-film forming solid. The average particle size was 440 °A with a range of 110–5850 °A.

EXAMPLE 8

This example shows the formation of a stable colloidal suspension of $CH_3SiO_{3/2}$ prepared by the emulsion polymerization of methyltrimethoxysilane in a basic solution using the ammonium and 1,1,3,3-tetramethylguanidine salts of lauric acid as surfactants. The amounts of the various components are shown in the following TABLE VII.

TABLE VII

| Run | Lauric acid, g | NH₃, g[a] | TMG, g[b] | H₂O, g | pH[c] | CH₃Si(OCH₃)₃[d] |
|---|---|---|---|---|---|---|
| A | 0.375 | 1.3 | 0.054 | 133.1 | 9.5 | 15.2 |
| B | 0.375 | 1.3 | 0.108 | 133.0 | 9.8 | 15.2 |
| C | 0.375 | 1.3 | 0.162 | 133.0 | 10.1 | 15.2 |
| D | 0.375 | 0.16 | 0.215 | 134.0 | — | 15.2 |

[a]The amount of a 10% aqueous solution.
[b]TMG is 1,1,3,3-tetramethylguanidine.
[c]The pH of the mixture before the addition of the silane. The pH of run D was not determined.
[d]Added over a period of 2 hours at room temperature.

In each run a stable emulsion of $CH_3SiO_{3/2}$ silsesquioxane was obtained. The results are summarized in the following TABLE VIII.

TABLE VIII

| Run | Percent Solids | Average Particle Size, °A | Particle Size Range, °A | Emulsion Appearance |
|---|---|---|---|---|
| A | 5.5 | 320 | 220–450 | hazy-blue |
| B | 5.5 | 550 | 410–640 | hazy-blue |
| C | 5.5 | 490 | 450–550 | hazy-blue |
| D | 5.6 | 950 | 620–1290 | milky-white |

EXAMPLE 9

This example shows the formation of stable colloidal suspensions of $(CF_3CH_2CH_2)SiO_{3/2}$ prepared by the emulsion polymerization of 3,3,3-trifluoropropyltrimethoxysilane in a basic aqueous solution using various carboxylic acid salts as surfactants. 3,3,3-Trifluoropropyltrimethoxysilane (11.0 g) was added dropwise to a mixture consisting of sodium oleate (7.5 g of the sodium oleate solution prepared in Example 6), ammonia (0.44 g of a 28.8% aqueous solution) and 131.1 g of additional water. A hazy-blue emulsion containing 5.4% solids was obtained.

3,3,3-Trifluoropropyltrimethoxysilane (11.0 g) was also added to a mixture consisting of lauric acid (0.38 g), ammonia (1.3 g of a 28.8% aqueous solution), sodium hydroxide (1.9 g of a 0.1 N solution) and water (135.7) the resulting emulsion was hazy-blue with 5.2% solids. Although the particle size of these two colloidal suspensions was not determined it is apparent from the appearance of the colloids that the average particle size is between 10 and 1000 angstroms.

EXAMPLE 10

This example shows the formation of a stable colloidal suspension of $C_6H_5SiO_{3/2}$ prepared by the emulsion polymerization of phenyltrimethoxysilane in a basic aqueous solution. Phenyltrimethoxysilane (11.3 g) was added dropwise over a period of 2 hours at room temperature to a mixture consisting of lauric acid (0.38 g), ammonia (1.3 g of a 10% aqueous solution), sodium hydroxide (1.9 g of a 0.1 N solution) and water (135.0 g). A hazy-blue emulsion with 5.2% solids was obtained. The solid was a white hard resin. The hazy-blue color indicates that the average particle size was between 10 and 1000 angstroms.

EXAMPLE 11

This example shows the formation of a stable colloidal suspension of $CH_3SiO_{3/2}$ and $HS(CH_2)_3SiO_{3/2}$ units prepared by the emulsion polymerization of methyltrimethoxysilane and 3-mercaptopropyltrimethoxysilane in a basic aqueous solution. A mixture of methyltrimethoxysilane (386 g) and 3-mercaptopropyltrimethoxysilane (15.4 g) was added dropwise with agitation to a mixture of lauric acid (5.58 g), ammonia (43.5 g of a 5% aqueous solution) and water (1549.5 g). The pH of the ammonium laurate solution, before the silane addition, was 9.5. The silane addition took place over a two hour period at room temperature. The resulting emulsion contained 10.4% solids. The average particle size was 580 °A with a range of 280–740 °A.

EXAMPLE 12

This example describes an unsuccessful attempt to prepare a colloidal suspension of $(CH_3)_2SiO$ using the procedure of this invention. This example is included for comparison purposes only. Dimethyldimethoxysilane (15.2 g) was added dropwise, with agitation over a two hour period at room temperature, to a mixture consisting of sodium oleate (7.5 g of the same aqueous sodium oleate solution prepared in Example 6), ammonia (0.44 g of a 28.8% aqueous solution) and water (136.9 g). During the addition of the silane the solution was a hazy white. After the completion of the silane addition the solution was a milky white. The resulting solution contained about 1.7% "solids" as opposed to an expected value of 5.0% solids based on the amount of silane added. The "solid" was not a solid at all but rather a clear thin fluid. Numerous other attempts to prepare a colloidal suspension of $(CH_3)_2SiO$ using the procedure of this invention also failed. In all of these attempts extensive creaming and poor conversion (less than 50%) to polymer was observed.

That which is claimed is:

1. A process for making a stable colloidal suspension of silsesquioxane with an average unit formula $RSiO_{3/2}$, where R is a monovalent hydrocarbon or substituted hydrocarbon radical containing 1 to 7 carbon atoms, which process comprises adding a silane having the formula $RSi(OR')_3$, wherein R' is selected from the group consisting of hydrogen, alkyl groups containing 1 to 4 carbon atoms,

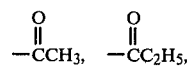

$-CH_2CH_2OH$, $-CH_2CH_2OCH_3$, and $-CH_2CH_2OC_2H_5$ groups, to a water and surfactant mixture, with agitation, where said water and surfactant mixture contains a sufficient amount of a pH modifying substance or substances to obtain a pH greater than or equal to 8 for said water and surfactant mixture prior to addition of said silane; where said surfactant is an organic carboxylic acid having greater than 8 carbon atoms or a water soluble salt of said carboxylic acid; and where said silsesquioxane has an average particle size of about 10 to 1000 angstroms.

2. A process as defined in claim 1 wherein the surfactant is a carboxylic acid of general formula R'''COOH where R''' is an aliphatic organic group containing from 9 to 20 carbon atoms or a water soluble salt of said carboxylic acid.

3. A process as defined in claim 2 wherein the surfactant is selected from the group consisting of lauric acid, stearic acid, oleic acid, sodium laurate, sodium stearate, sodium oleate, ammonium laurate, ammonium stearate, and ammonium oleate.

4. A process as defined in claim 3 wherein the surfactant is present at about 0.02 to 0.04 parts by weight for every one part by weight of $RSiO_{3/2}$.

5. A process as defined in claim 4 wherein the water and surfactant mixture contains a sufficient amount of a pH modifying substance or substances to obtain a pH of about 8.5 to 10.5 for said water and surfactant mixture prior to addition of said silane.

6. A process as defined in claims 1, 2, 3, 4, or 5 wherein the pH modifying substance is ammonia.

7. A process as defined in claim 6 wherein ammonia is present at a concentration of about 0.02 to 0.10 moles per liter.

8. A process as defined in claims 1, 2, 3, 4, or 5 wherein R is selected from the group consisting of methyl, 3,3,3-trifluoropropyl, 3-mercaptopropyl, and phenyl radicals.

9. A process as defined in claim 6 wherein R is selected from the group consisting of methyl, 3,3,3-trifluoropropyl, 3-mercaptopropyl, and phenyl radicals.

10. A process as defined in claim 6 wherein both R and R' are methyl radicals.

11. A process as defined in claim 2 wherein both R and R' are methyl radicals; wherein ammonia is the pH modifying substance present at a concentration of about 0.04 to 0.06 moles per liter; and wherein the surfactant is ammonium laurate present at about 0.02 to 0.04 parts by weight per one part by weight $RSiO_{3/2}$.

12. A process as defined in claim 11 wherein the average particle size of said silsesquioxane is in the range of 10 to 500 angstroms.

13. A stable colloidal suspension of silsesquioxane prepared by the process defined in claims 1, 2, 3, 4, 5, 11, or 12.

14. A stable colloidal suspension of silsesquioxane prepared by the process defined in claim 7.

15. A stable colloidal suspension of silsesquioxane prepared by the process defined in claim 9.

16. A stable colloidal suspension of silsesquioxane prepared by the process defined in claim 10.

* * * * *